United States Patent
Palfey et al.

(10) Patent No.: US 6,177,737 B1
(45) Date of Patent: Jan. 23, 2001

(54) VEHICLE ELECTRICAL POWER BACK-UP CIRCUIT AND METHOD

(75) Inventors: Paul B. Palfey; Gary J. Gress, both of Portland, OR (US)

(73) Assignee: Proflow, Inc., Portland, OR (US)

( * ) Notice: Under 35 U.S.C. 154(b), the term of this patent shall be extended for 0 days.

(21) Appl. No.: 08/995,957

(22) Filed: Dec. 17, 1997

(51) Int. Cl.[7] .................................................. H02J 7/00
(52) U.S. Cl. ......................... 307/64; 307/44; 307/66; 307/9.1
(58) Field of Search ................... 307/64, 66, 44, 307/80, 10.1, 9.1; 365/229, 228; 320/128, 137

(56) References Cited

U.S. PATENT DOCUMENTS

| | | | |
|---|---|---|---|
| 3,873,846 | * 3/1975 | Morio et al. | 307/80 |
| 4,227,257 | * 10/1980 | Sato | 365/229 |
| 4,297,629 | * 10/1981 | Godard et al. | 320/128 |
| 4,691,118 | 9/1987 | Nishimura . | |
| 5,375,246 | 12/1994 | Kimura et al. . | |
| 5,569,997 | * 10/1996 | Berger | 307/66 |
| 5,616,968 | * 4/1997 | Fujii et al. | 307/66 |
| 5,637,978 | * 6/1997 | Kellett et al. | 320/102 |

FOREIGN PATENT DOCUMENTS

| | | |
|---|---|---|
| 3-11393 | 1/1991 | (JP) . |
| 5-191432 | 9/1993 | (JP) . |

OTHER PUBLICATIONS

Maxim 12V/15V or Adjustable, High–Efficiency, Low $I_Q$, Set–Up DC–DC Converters, Nov. 1997.
Maxim NiCd/NiMH Battery Fast–Charge Controllers, Jan. 1997.

* cited by examiner

*Primary Examiner*—Albert W. Paladini

(57) ABSTRACT

A vehicle electrical back-up circuit and method. Vehicle electrical devices normally receive the power required for their operation from a vehicle electrical system at a first voltage. An auxiliary storage battery is provided at a second, lower voltage. Preferably, charge is maintained in the battery by a charging circuit powered by the vehicle electrical system. A voltage booster circuit boosts the second voltage of the auxiliary storage battery back to the first voltage, providing auxiliary electrical power available for operating the electrical devices.

10 Claims, 1 Drawing Sheet

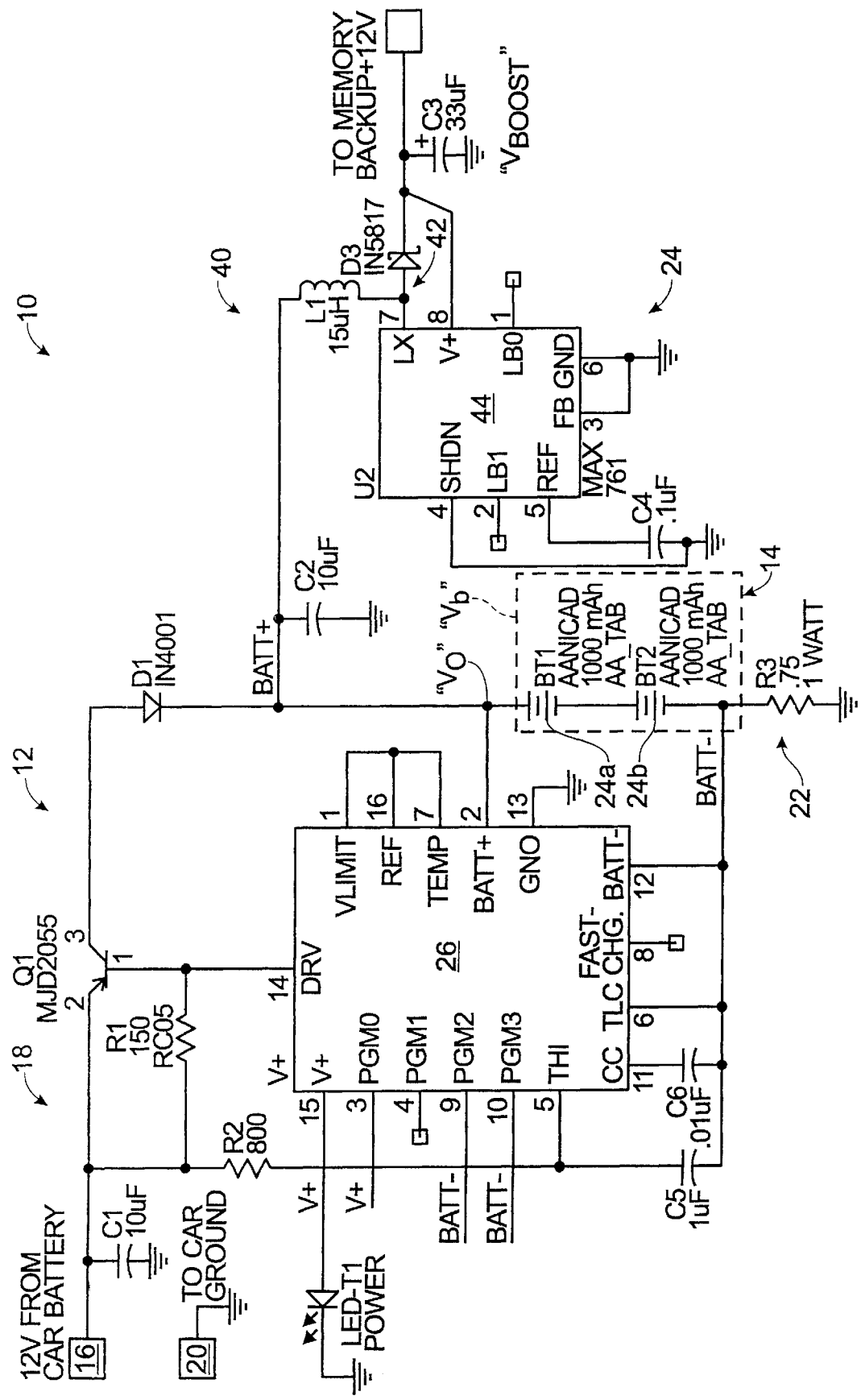

VEHICLE ELECTRICAL POWER BACK-UP CIRCUIT AND METHOD

BACKGROUND OF THE INVENTION

This invention relates to a method and apparatus for remotely backing up a vehicle's volatile memory. The invention more particularly relates to such a method and apparatus that connects to the vehicle's existing electrical system.

Modern vehicles, such as automobiles, employ a number of microprocessor based electrical subsystems, including engine management systems and accessory subsystems such as radio equipment. A common characteristic of these microprocessor based systems and subsystems is that they employ volatile memory, such as RAM, for storing processor generated data, such as engine management data, or user selected data, such as selected radio channels or time of day. Volatile memory is typically selected for these applications because it is durable and, for storing relatively small amounts of data, it is cost effective. Notwithstanding, a notorious drawback of volatile memory in these applications is that, once power is lost, even for a very short time, the memory's contents are also lost. Solutions to this problem so far have not been entirely satisfactory.

For example, Berger, U.S. Pat. No. 5,569,997, proposes a POWER SUPPLY FOR VOLATILE MEMORY DEVICES AND PORTABLE ELECTRICAL APPLIANCE IN VEHICLES employing a rechargeable battery which is isolated from the vehicle's main battery by a diode. The rechargeable battery is at a lower voltage than the main battery and, therefore, must be connected directly to the 5 volt power inputs of the memory circuits in order to provide back-up power. These power inputs, however, are not generally accessible after the circuit has been incorporated in an electrical subsystem and installed in the vehicle. Therefore, such devices cannot be connected simply to automobile electrical devices, such as radio devices, that are adapted to connect directly to a 12 volt power source and are typically installed after-market.

As another example, Kimura, U.S. Pat. No. 5,375,246, proposes a BACK-UP POWER SUPPLY APPARATUS FOR PROTECTION OF STORED DATA having a switch operable between two positions and selecting either a main battery or a back-up battery having a voltage that differs from the main battery voltage by about a diode drop. For 12 volt automobile systems, a back-up battery voltage of about 12 volts would be required. A disadvantage of a requirement for a 12 volt back-up battery voltage is that higher voltage batteries are generally heavier and take up more space than batteries having lower voltages.

Accordingly, there is a need for a vehicle electrical power back-up circuit and method that provides for ease of connection to electrical subsystems designed for after-market incorporation into the vehicle, and that provides for a savings in weight, bulk and cost over the prior art

SUMMARY OF THE INVENTION

The vehicle electrical power back-up circuit and method of the present invention solves the aforementioned problems and meets the aforementioned needs by providing a simple, physically small and cost-effective circuit employing standard integrated circuits and standard low voltage, rechargeable storage batteries.

The electrical power back-up circuit and method employs an auxiliary storage battery and, preferably, a charging circuit for providing or maintaining charge in the storage battery. The charging circuit receives power from the electrical system of the vehicle. The electrical system of the vehicle generally includes a main storage battery, such as a nominal 12V, lead-acid storage battery, and an alternator for charging the main storage battery while the engine is running. The main storage battery is large and heavy for storing sufficient energy to crank the engine of the vehicle.

The auxiliary storage battery is provided to maintain adequate power to volatile memory devices, so that the devices do not lose their memories if the vehicle electrical system fails, even for an instant, to supply power. A relatively small amount of energy is required for this purpose, and the auxiliary storage battery may be relatively light and small.

In the present invention, the auxiliary storage battery is adapted to provide a relatively low voltage, so that a minimum number of standard, low voltage rechargeable battery cells may be employed therein. For example, an exemplary auxiliary storage battery comprises two 1.2 Volt Nickel-Cadmium ("NiCad") penlight battery cells coupled in series to produce a 2.4 Volt output voltage. By employing an auxiliary storage battery having a relatively low voltage, the present invention provides an auxiliary storage battery that makes most effective use of relatively small energy storage requirements, so that the auxiliary storage battery may be most inexpensively and compactly produced, and so that it may be mounted virtually anywhere in the vehicle.

The invention further provides a voltage booster circuit, coupled to the auxiliary storage battery, to boost the relatively low voltage output of the auxiliary storage battery back to the relatively high voltage of the vehicle electrical system. This provides the additional utility of permitting the vehicle electrical back-up circuit to be connected simply to automobile electrical devices, such as radio devices, which are adapted for direct connection to the higher voltage of the vehicle electrical system and that are typically installed after-market.

Accordingly, it is a principal object of the present invention to provide a novel vehicle electrical power back-up circuit and method.

It is another object of the present invention to provide such a circuit and method that provides for ease of connection to electrical subsystems designed for after-market incorporation into the vehicle.

It is yet another object of the present invention to provide such a circuit and method that provides for a savings in weight, bulk and cost over the prior art.

The foregoing and other objects, features and advantages of the invention will be more readily understood upon consideration of the following detailed description of the invention, taken in conjunction with the following drawings.

BRIEF DESCRIPTION OF THE DRAWINGS

The FIGURE is a schematic of a vehicle electrical power back-up circuit according to the present invention.

DETAILED DESCRIPTION OF A PREFERRED EMBODIMENT

A vehicle electrical power back-up circuit and method according to the present invention is particularly adapted for employment in a vehicle having a nominal 12 volt electrical system, serviced by a nominal 12 volt main storage battery and will be described in connection therewith. Notwithstanding, the invention may be employed to back up electrical systems depending on greater or lesser voltages, whether or not a storage battery is included in the systems.

Referring to the FIGURE, a vehicle electrical back-up circuit 10 according to the present invention is shown. The circuit 10 has the advantage of being relatively simple, physically small and cost-effective. The circuit employs an auxiliary storage battery 14, and preferably includes a charging circuit 12 for providing or maintaining electrical charge in the storage battery 14. The charging circuit 12 is powered from a 12 volt output 16 of the electrical system of the vehicle with respect to a vehicle ground 20. The output 16 may be tapped from the vehicle at any of a number of locations. Preferably, the output is always "live"; however, an output 16 may be provided for use with the circuit 10 that is only active under specific circumstances, such as when an ignition switch in the vehicle is turned on.

The charging circuit 12 has a positive input 18 electrically connected to the positive output 16 of the vehicle electrical system and a ground input 22 electrically connected to the vehicle ground 20. The charging circuit 12 is adapted to provide a voltage $V_0$ which is equal to or greater than the voltage produced by the auxiliary battery 14 so as to maintain the charge thereof without damage. Specific, preferred embodiments of the charging circuit 12 and auxiliary battery 14 will next be described. In the light thereof appropriate adaptation of other charging circuits 12 and auxiliary batteries 14 according to the present invention will be readily apparent to those having ordinary skill in the electrical arts.

The preferred auxiliary storage battery 14 comprises two nominal 1.2 Volt Nickel-Cadmium ("NiCad") AA penlight battery cells 24a, 24b connected in series to produce a 2.4 Volt DC output voltage $V_b$. By employing two, small NiCad cells, the preferred battery 14 makes most effective use of relatively small energy storage requirements, so that the battery may be most inexpensively and compactly produced, and so that it may be mounted virtually anywhere in the vehicle. However, the auxiliary storage battery may include any number of cells of any number of sizes without departing from the principles of the invention. For example, additional or larger battery cells may be employed to increase auxiliary battery mass and thereby increase storage capacity. On the other hand, fewer or smaller battery cells may be employed if a decreased storage capacity is sufficient. The size and number of the cells is ideally selected by considering the energy storage density of the cells and determining the total cell mass required for storing a desired amount of energy therein, the latter being determined by considering the power requirements of the vehicle-memory which it is desired to back-up. Moreover, the cells may have any combination of series and parallel interconnections, thereby providing a wide range of auxiliary storage voltages. This results from an outstanding feature of the present invention, that the voltage requirements of the memory, so long as they are not exceeded, need not be considered in determining the configuration of the auxiliary battery 14, as will be made clear below.

For charging the aforedescribed battery 14, a preferred charging circuit 12 comprises a standard integrated charging circuit 26 such as that marketed by MAXIM Integrated Products, Inc. of 120 San Gabriel Drive, Sunnyvale, Calif. (hereinafter "MAXIM") as the "MAX713 NiCd/NiMH Battery Fast-Charge Controller" which will be described herein. The MAX integrated charging circuit 26 may be programmed to charge up to 16 NiCad cells connected in series, provides for a linear and a switching-mode, and an adjustable charging rate. The integrated charging circuit 26 operates by providing a maximum output current for fast-charging and, once full charge is detected, reducing the current to the level of a trickle charge.

As a standard product, the MAXIM integrated charging circuit 26 is provided with data and design information available upon request from MAXIM, all of which is incorporated by reference herein. Particular reference is made to the applications literature having part No. 19-0100; Rev 3; 1/97. As it is shown herein in the FIGURE, the circuit 26 is connected for operation in its linear mode. Pins 3 ("PGM0") and 4 ("PGM1") are selected for charging two cells, so that PGM0 is connected to pin 15 ("V+") and pin PGM1 is left open. The time during which fast-charging is permitted is limited by providing a time-out of 264 minutes, accomplished programmatically by connecting pins 9 ("PGM2") and 10 ("PGM3") to pin 12 ("BATT−"). The maximum cell voltage is set to 2 volts by tying pin 1 ("VLIMIT") to pin 16 ("REF"). The charging output of the MAXIM integrated charging circuit 26 is available between pins 2 ("BATT+") and 12 ("BATT−"). A sense resistor R3 is employed external to the integrated charging circuit 26 to limit the fast-charge current.

The charging circuit 12 further includes, for operation with the just-described MAXIM integrated charging circuit 26, a pass transistor Q1 and blocking diode D1. The integrated charging circuit 26 controls the pass transistor through the pin 14 ("DRV") to pass a charging current $I_0$ to the battery 14. Along with Q1 and D1, capacitors C5 and C6 are required external components. $V_0$ of the vehicle's electrical system should be at least 1.5 volts greater than the auxiliary battery voltage $V_b$, to allow for worst-case voltage drops across the pass transistor Q1, the blocking diode D1 and the sense resistor R3.

The circuit 10 further provides a voltage booster circuit 40, coupled to the auxiliary storage battery 14, to boost the relatively low voltage output of the auxiliary storage battery back to the relatively high voltage of the vehicle electrical system. As an example, with reference to the aforedescribed preferred auxiliary battery 14 for use in a vehicle having a 12 volt electrical system, the circuit provides for boosting the nominal 2.4 volts of the battery 14 to about 12 volts for interfacing directly to power input terminals of vehicle electrical sub-systems, such as radio systems, adapted for receiving 12 volt power. Herein, discussion of the booster circuit 40 presumes use with the aforedescribed preferred charging system 12 and battery 14. In the light thereof, adaptation of the booster circuit 40 for use with other charging circuits 12 and auxiliary batteries 14 according to the present invention will be readily apparent to those having ordinary skill in the electrical arts.

The booster circuit 40 has a positive output 42, to which is provided the auxiliary battery output voltage $V_b$, and a negative input 24 electrically connected to the ground 20 of the vehicle electrical system. The booster circuit is adapted to provide a boosted output voltage $V_{boost}$ that is equal to about 12 volts DC in the aforedescribed vehicle electrical system from the voltage $V_b$. $V_{boost}$ is made available for direct connection to the DC power inputs of vehicle systems or subsystems having volatile memory, to provide back-up power to the volatile memory to maintain the contents of the volatile memory during any failure of the vehicle electrical system to supply sufficient power therefor. A specific, preferred embodiment of the booster circuit 40 will next be described. With reference thereto, adaptation of other booster circuits 40 according to the present invention will be readily apparent to those having ordinary skill in the electrical arts.

A preferred booster circuit 40 comprises a standard integrated booster circuit 44 such as that marketed by MAXIM as the "MAX761 12V/15V or Adjustable, High-Efficiency, Low $I_Q$, Step-Up DC-DC Converter" which will be described herein. The MAXIM integrated booster circuit 44 is a switch-mode, pulse-frequency-modulation power supply having an input range of 2V to 16.5V and an output voltage which is preset at 12 VDC.

As a standard product, the MAXIM integrated booster circuit 44 is provided with data and design information, available upon request from MAXIM and all of which is incorporated by reference herein. Particular reference is made to the applications literature having part No. 19-0201; Rev 0; 11/93. As it is shown in the FIGURE, the circuit 44 is connected for operation in its bootstrapped mode, wherein the circuit is powered at pin 8 ("V") from the boosted output voltage $V_{boost}$. Pin 4 ("SHDN" or Shutdown mode) is tied to ground for normal operation. Pin 1 ("LBO" or low-battery output) and pin 2 ("LBI" or low-battery indicator) are not used. The output 42 of the circuit 44, taken at pin 7 ("LX"), is provided the auxiliary battery voltage $V_b$ through an inductor L1. LX is the drain of an N-channel power MOSFET. Current through the coil is switched by LX, producing a voltage amplification which is stored on a capacitor C3 and maintained by a Schottky diode D3.

The battery voltage output $V_b$, and hence the output 42 of the booster circuit 44 at LX, is isolated from the vehicle electrical system by the blocking diode D1. The booster circuit 40 normally produces its boosted output voltage $V_{boost}$ in parallel with the power supplied by the vehicle electrical system. When power from the vehicle electrical system is interrupted, charging of the auxiliary battery 14 by the charging circuit 12 ceases; however, the battery is in a charged condition and can supply power during the outage as a result of continued operation of the booster circuit.

It is to be recognized that, while a specific vehicle electrical power back-up circuit and method has been shown as preferred, other configurations and methods could be utilized, in addition to configurations and methods already mentioned, without departing from the principles of the invention. For example, while the vehicle electrical power back-up circuit and method may be adapted to supply a particular voltage as a back-up voltage, such as 12 volts, the voltage supplied may be less than or greater than the particular voltage if desired. For example, the MAXIM integrated booster circuit 44, while being preset to 12V, may be reconfigured to produce other voltages between 5V and 16.5V using external resistors as described in the aforementioned applications literature.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

We claim:

1. An electrical power back-up circuit for providing back-up power to a vehicle electrical device adapted for receiving the power required for its operation from a vehicle electrical system at a first, primary voltage, comprising:

a storage module adapted for storing electrical energy at a second, storage voltage which is substantially lower than the first voltage, and releasing said electrical energy over a period of time at said second voltage to provide electrical power at said second voltage; and a booster module adapted for receiving at least a portion of said electrical power provided by said storage module at said second voltage, boosting the voltage thereof from said second voltage to about the first voltage, and then providing the boosted voltage to the vehicle electrical device as auxiliary power available for its operation.

2. The method of claim 1, wherein the first, primary voltage is about 12 volts.

3. An electrical power back-up circuit for providing back-up power to a vehicle electrical device adapted for receiving the power required for its operation from a vehicle electrical system at a first, primary voltage, comprising a storage module adapted for storing electrical energy at a second, storage voltage which is substantially lower than the first voltage, and releasing said electrical energy over a period of time at said second voltage to provide electrical power at said second voltage, and a booster module adapted for receiving at least a portion of said electrical power provided by said storage module at said second voltage, boosting the voltage thereof from said second voltage to about the first voltage, and then providing the boosted voltage to the vehicle electrical device as auxiliary power available for its operation, wherein said storage module is further adapted for receiving at least a portion of said electrical energy from the power supplied by the vehicle electrical system at the first voltage.

4. The method of claim 3, wherein the first, primary voltage is about 12 volts.

5. The electrical power back-up circuit of claim 3, further comprising a charging module adapted for receiving electrical power from the vehicle electrical system at the first voltage and producing electrical power at about said second voltage, and for providing said electrical power to said storage module, wherein said storage module is further adapted for receiving at least a portion of said electrical energy from the power produced by said charging module.

6. The electrical power back-up circuit of claim 5, further comprising an isolating element for electrically isolating said booster module from said charging module.

7. The method of claim 5, wherein the first, primary voltage is about 12 volts.

8. A method for providing back-up power to a vehicle electrical device adapted for receiving the power required for its operation from a vehicle electrical system at a first, primary voltage, comprising the steps of:

storing electrical energy at a second, storage voltage which is substantially lower than the first voltage;

releasing said electrical energy over a period of time at said second voltage to provide electrical power at said second voltage;

boosting the voltage of said electrical power from said second voltage to about the first voltage; and providing the boosted voltage to the vehicle electrical device as auxiliary power available for its operation.

9. A method for providing back-up power to a vehicle electrical device adapted for receiving the power required for its operation from a vehicle electrical system at a first, primary voltage, comprising the steps of storing electrical energy at a second, storage voltage which is substantially lower than the first voltage, releasing said electrical energy over a period of time at said second voltage to provide electrical power at said second voltage, boosting the voltage of said electrical power from said second voltage to about the first voltage, providing the boosted voltage to the vehicle electrical device as auxiliary power available for its operation, and receiving at least a portion of said electrical energy from the power supplied by the vehicle electrical system at the first voltage.

10. The method of claim 9, further comprising receiving electrical power from the vehicle electrical system at the first voltage, and producing electrical power at about said second voltage, wherein said receiving at least a portion of said electrical energy from the power supplied by the vehicle electrical system comprises receiving at least a portion of said electrical energy from the power produced by said charging module.

* * * * *